United States Patent
Dunsmoir et al.

(10) Patent No.: US 6,671,854 B1
(45) Date of Patent: Dec. 30, 2003

(54) DYNAMIC WEB OBJECT ROW COUNT IN HYPER TEXT MARKUP LANGUAGE

(75) Inventors: John W. Dunsmoir, Round Rock, TX (US); Sandra H. Jacobs, Austin, TX (US); Christopher Daniel Reech, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/435,006

(22) Filed: Nov. 5, 1999

(51) Int. Cl.[7] .............................................. G06F 15/00
(52) U.S. Cl. ........................ 715/513; 707/101; 707/102
(58) Field of Search ................................. 707/513, 101, 707/102; 715/501.1, 526

(56) References Cited

U.S. PATENT DOCUMENTS

| | | | | |
|---|---|---|---|---|
| 6,021,426 A | * | 2/2000 | Douglis et al. ............. | 709/200 |
| 6,389,437 B2 | * | 5/2002 | Stoub ......................... | 715/523 |
| 6,411,959 B1 | * | 6/2002 | Kelsey ........................ | 707/101 |
| 6,429,880 B2 | * | 8/2002 | Marcos et al. .............. | 345/744 |

\* cited by examiner

Primary Examiner—Joseph H. Feild
Assistant Examiner—Maikhanh Nguyen
(74) Attorney, Agent, or Firm—Robert H. Frantz; David A. Mims, Jr.

(57) ABSTRACT

The disclosed method, system and computer program product converts static, fixed-count multi-row web objects in web pages, such as HTML tables and lists, to dynamic, variable-count multi-row web objects by first copying one of the row formats from the original static web object into a plurality of string variables which are preferably organized as an array, then inserting new content information into each row format definition contained within each string variable, and finally creating a new multi-row web object based upon the final contents of the string variables. This process of creating a variable row-count web object using an array of string variables supports dynamic web page content generation needs of many web server systems.

32 Claims, 2 Drawing Sheets

DYNAMIC WEB OBJECT ROW COUNT IN HYPER TEXT MARKUP LANGUAGE

This application is related to U.S. application Ser. No. 09/435,004, filed on Nov. 5, 1999, by John W. Dunsmoir, et al.

FEDERALLY SPONSORED RESEARCH AND DEVELOPMENT STATEMENT

This invention was not developed in conjunction with any Federally sponsored contract.

MICROFICHE APPENDIX

Not applicable.

The related application, U.S. application Ser. No. 09/435,004, filed on Nov. 5, 1999, by John W. Dunsmoir, et al., is incorporated herein by reference in its entirety, including drawings, and hereby are made a part of this application.

BACKGROUND OF THE INVENTION

1. Field of the Invention

This invention pertains to the arts of electronic web site technology, and especially to the arts of designing, developing, testing, configuring and commercially exploiting web site pages in HTML which contain multiple-row objects such as tables, check boxes, radio buttons and lists.

2. Description of the Related Art

As described in the related application, the use of the World Wide Web ("WWW") has grown dramatically and is expected to continue to grow as more businesses, government agencies, educational institutions, and private consumers become web users and web site owners. Hyper Text Markup Language ("HTML") documents are the most common type of document which are found on the Internet and on intranets today. HTML documents have gained widespread acceptance partly because of the simplicity of the HTML language, but primarily because of the open nature of the standard—it is not a proprietary or closed standard. As a result, several commercially available client browser software packages are available which can receive and interpret/display HTML documents, and even more software packages are available to allow quick, pseudo-what-you-see-is-what-you-get ("WYSIWYG") document design. In the former category of software packages are popular personal computer web browser software packages such as Microsoft's Internet Explorer and Netscape's Navigator. In the later category of software pages are Microsoft's FrontPage and Corel's PageMaker.

As a web browser receives an HTML document, it determines how to display each object, such as a list, table, text paragraph, or graphic image, based on the web browser computer's hardware capabilities and display preferences. For example, the same web page may be visually displayed somewhat differently on a computer with 21-inch high-resolution monitor than on a computer with a 14-inch low-resolution monitor. In some cases of extremely low capabilities of display hardware and software, such as a palm-top computer equipped with a monochrome liquid crystal display ("LCD"), graphics may not be displayed at all.

While a web designer works to define the layout and content of an HTML page, he or she must keep in mind these variations. Even though the web browser software attempts to adapt the display of an HTML page to the system display available, a web designer can significantly enhance the appearance of the web page through careful consideration during the design. This means that each object, including tables, placed in an HTML page must be considered for variations of display.

So, it is often desirable to create the physical "layout" or arrangement of web objects prior to creating the actual information content of the page. In some cases, including situations where dynamic content is expected, definition of the page layout prior to creation of the content may be unavoidably required. For example, a web page which will be using a table to display all stock prices which have changed by more than 5% may require a table with 50 listings one day, and may require a table with 115 listings the next day.

Table 1 shows example HTML code for displaying a table which has 4 rows and 3 columns in each row. As discussed in the related application, the HTML syntax consists of tags which are enclosed in pointed brackets, "<" and ">", parameters for those tags, and text. In the example HTML document of Table 1, the opening <HTML> tag simply indicates that the rest of the file (until </HTML> is found) is to be interpreted as HTML. The <BODY . . . > tag sets the colors of the display of the document for the background, hyperlinks, and plain text. The definition of the table begins with the <TABLE . . . > tag.

As shown in Table 1, the HTML table tag includes parameters to set the thickness of the border line to 1 pixel, the width of the row to 100% of the display window, and the padding and spacing definition of the cells. The web browser uses these as guidelines when interpreting and displaying the table on the system display.

Each row in the table is started with a <TR> tag and concluded with a </TR> tag. Horizontal justification and vertical placement of the text within cells of a row are optionally specified by the ALIGN and VALIGN parameters. Between the <TR> and </TR> tags are the definitions of the cells and their contents, using the <TD> and </TD> tags to start and end a cell, respectively. The contents to be displayed in the cell is given as plain text located between the <TD> and </TD> tags. This syntax is well-known within the art.

TABLE 1

Example Table in an HTML Document

```
<HTML><HEAD>
<META NAME="Sample Table">
<TITLE></TITLE></HEAD>
<BODY TEXT="#000000" LINK="#0000ff" VLINK="#551a8b"
ALINK="#ff0000" BGCOLOR="#ffffff">
<P>This is a sample HTML table of 3 columns by 4 rows:</P>
<TABLE BORDER="1" WIDTH="100%" CELLPADDING="1"
CELLSPACING="1">
<TR VALIGN="TOP"><TD>Row 1, Col 1 Contents</TD>
<TD>Row 1, Col 2 contents</TD>
<TD>Row 1, Col 3 contents</TD></TR>
<TR VALIGN="TOP"><TD>Row 2, Col 1 Contents</TD>
<TD>Row 2, Col 2 contents</TD>
<TD>Row 2, Col 3 contents</TD></TR>
<TR VALIGN="TOP"><TD>Row 3, Col 1 Contents</TD>
<TD>Row 3, Col 2 contents</TD>
<TD>Row 3, Col 3 contents</TD></TR>
<TR VALIGN="TOP"><TD>Row 4, Col 1 Contents</TD>
<TD>Row 4, Col 2 contents</TD>
<TD>Row 4, Col 3 contents</TD></TR></TABLE>
<P>End of sample HTML file.</P>
</BODY></HTML>
```

FIG. 1 shows a portion of a web browser computer screen (1) on which a web browser software package (2), such as Netscape's Navigator, is displaying the sample HTML code of Table 1. A standard paragraph (3) is shown preceeding the table (4) of the example code. The table occupies the full width of the window in which the web browser software is running. If the window were re-sized smaller or larger, the web browser would display each row of the table (4) narrower or wider as appropriate.

Web browser software packages, however, only display static, or fixed HTML. So, if a table is to be displayed with 14 rows and three columns, the HTML transmitted to the web browser must include 14 row definitions as 14 <TR> and </TR> pairs, and 3 cell <TD> and </TD> pairs per row.

Other multi-row web objects are similar in nature in HTML to the definition for tables. For example, the HTML for an unordered list is shown in Table 2.

TABLE 2

Example Unordered List in an HTML Document

<ul>
<li> This is the first item in the list </li>
<li> This is the second item in the list </li>
<li> This is the third and last item in the list </li>
</ul>

In the example of Table 2, an unordered, un-numbered list is displayed having three items in it. The <ul> tag starts the list, and the </ul> tag ends the list, with each element or row in the list being started and ended by <li> and </li>, respectively.

Table 3 shows an ordered and numbered list in HTML, which is very similar to unordered lists. The <ol> and </ol> tag pair define the beginning and ending of the list, and each list item or list row is defined by a <li> and </li> tag pair. In the example of Table 3, each item listed in the list will be preceded by a number or letter based on the item's position within the list, such as 1,2,3. . . , or A,B,C, . . . or i,ii,iii,iv . . . The web browser generates the numbers for the items based on a default numbering system, or a defined numbering system using a <ol type=> tag. This syntax for generating lists is also well-known within the art.

TABLE 3

Example Ordered List in an HTML Document

<ol>
<li> This is the first item in the list </li>
<li> This is the second item in the list </li>
<li> This is the third and last item in the list </li>
</ol>

In order for a web server to send HTML pages to various browsers which have tables, lists and other row-oriented web objects of varying length, several prior art technologies exist. The most common technology would be for the web designer to include a client-side script, which is executable code, included in the HTML page itself. When the HTML page is received by the browser computer, the browser software executes the client-side script and generates the necessary HTML lines for the browser to display a table with certain characteristics and content. This however places a burden on the processing of the browser client computer, and it presents compatibility problems as not all browser software packages support all client-side scripting languages.

An alternative method is for the web server to dynamically create the HTML using Common Gateway Interface ("CGI") calls to programs residing and executing on the web server computer to generate the appropriate HTML table code. This may place an unacceptable processing burden on the web server computer, and may also lead to compatibility issues with the CGI program due to the variations in web server hardware platforms and operating systems.

Both of the solutions present another problem in that the web page designer now must have programming expertise in either client-side scripts, CGI scripts, or both. Additionally, it may be difficult to predict the actual appearance of a web page as the table HTML is not actually available during graphic design for the web designer to place on the page and arrange with other web objects.

Therefore, there is a need in the art for a server-side means to allow a web designer to place a sample row-oriented web object on a web page under design, and to allow the sample object to be readily replaced with an actual object while minimizing programming skills necessary but allowing a reasonable predictability of the visual display of the actual table in the HTML page. Further, there is a need in the art for this server-side means to be compatible with virtually any web server platform to enhance its usefulness to the industry. Finally, there is a need in the art for this server-side means to be suitable for real-time use during web server operation so as to enable real-time inclusion of tables in web pages based on dynamic format and content requirements.

BRIEF DESCRIPTION OF THE DRAWINGS

The following detailed description when taken in conjunction with the figures presented herein present a complete description of the present invention.

SUMMARY OF THE INVENTION

The foregoing and other objects, features and advantages of the invention will be apparent from the following more particular description of a preferred embodiment of the invention, as illustrated in the accompanying drawings wherein like reference numbers represent like parts of the invention.

The invention provides a system and method for extracting a multi-row web object format, such as a table or numbered list definition, from a template HTML document, and replacing the multi-row web object with another multi-row web object having a different row count. The web designer is not required to anticipate or known the actual number of rows of the object at the time of the web page design; rather, he or she may simply insert a single-row web object as a place-holder in the template and the system will replace the object with the actual multi-row web object on command or at run-time.

DETAILED DESCRIPTION OF THE INVENTION

The preferred embodiment of the invention is to realize the system in conjunction with a suitable web server computer platform, such as an IBM RS/6000 computer platform running a suitable operating system and web tool software suite, such as the IBM AIX operating system and the IBM WebSphere Application Server product. Alternative computer platforms, web server software, and operating systems such as Microsoft NT or IBM OS/2, and IBM-compatible personal computers or Sun workstations, can be utilized, as well. Since the Boson/Quark technology described in the related application is preferably realized as a Java servlet, many web server platforms will meet the technical requirements of the invention at hand.

As described in the related application, the Boson receives two inputs: (1) a HTML page to be used as a layout template, and (2) a set of web objects content parameters for insertion into the template. Boson first extracts the object definitions and document format definitions, such as table, list, radio button, background, and font definitions, and creates a template in a set of string variables. If a multi-row web object is encountered while scanning the input HTML file, an array of string variables is created, each element of the array representing a set of HMTL tags and parameters for a row of the multi-row web object.

For example, if a list is found in the input HTML file, an array of string variables is created, and the HTML tags from the first row are loaded into each string variable in the array. Then, Boson scans the new list of content parameters to be inserted, adding the new parameter values, including text strings, bullet types, etc., to the "rows" contained in the string variables of the array.

Figure 1:
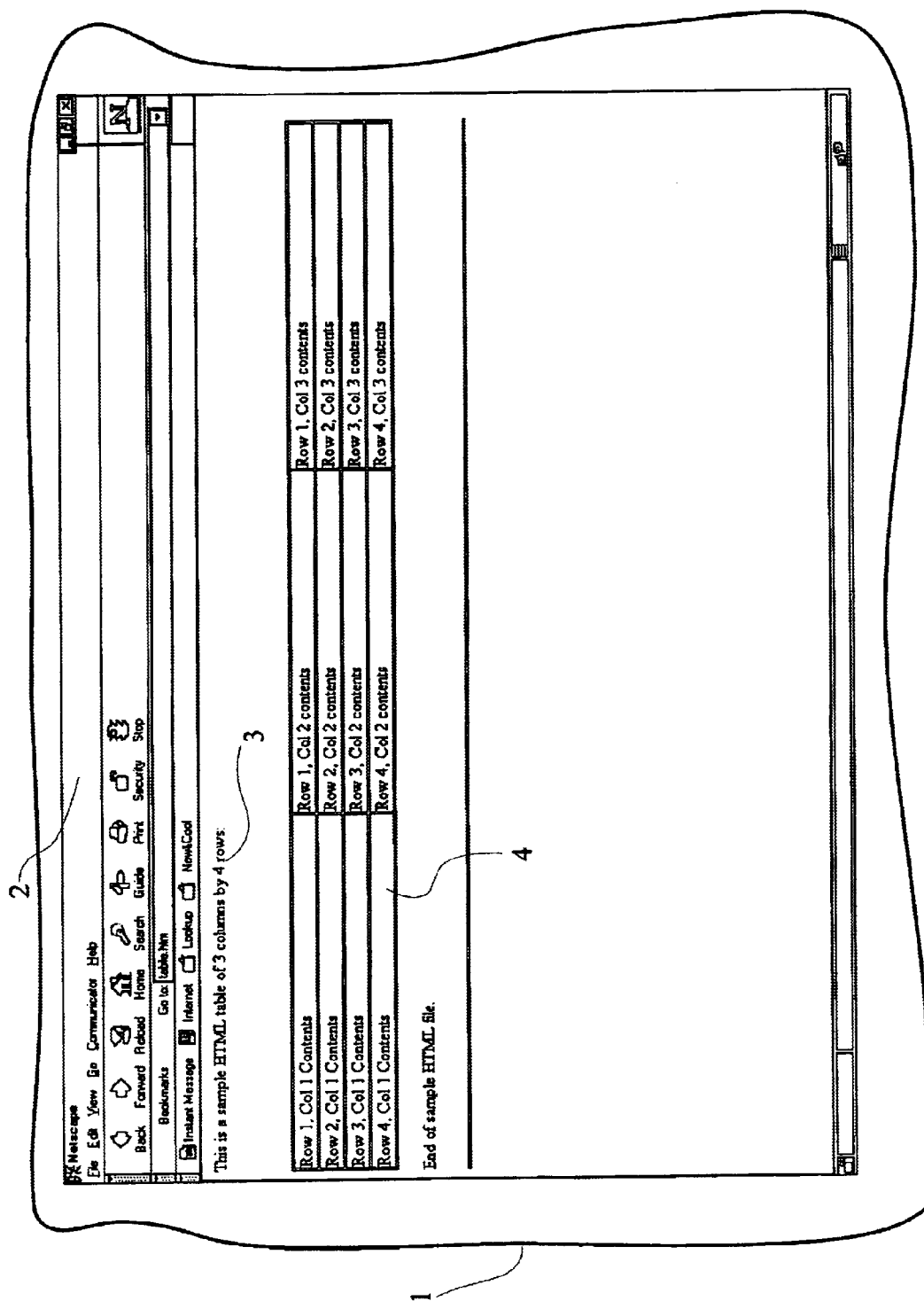
FIG. 1 shows a portion of a computer screen on which a table in HTML is being displayed using a web browser.
Figure 2:
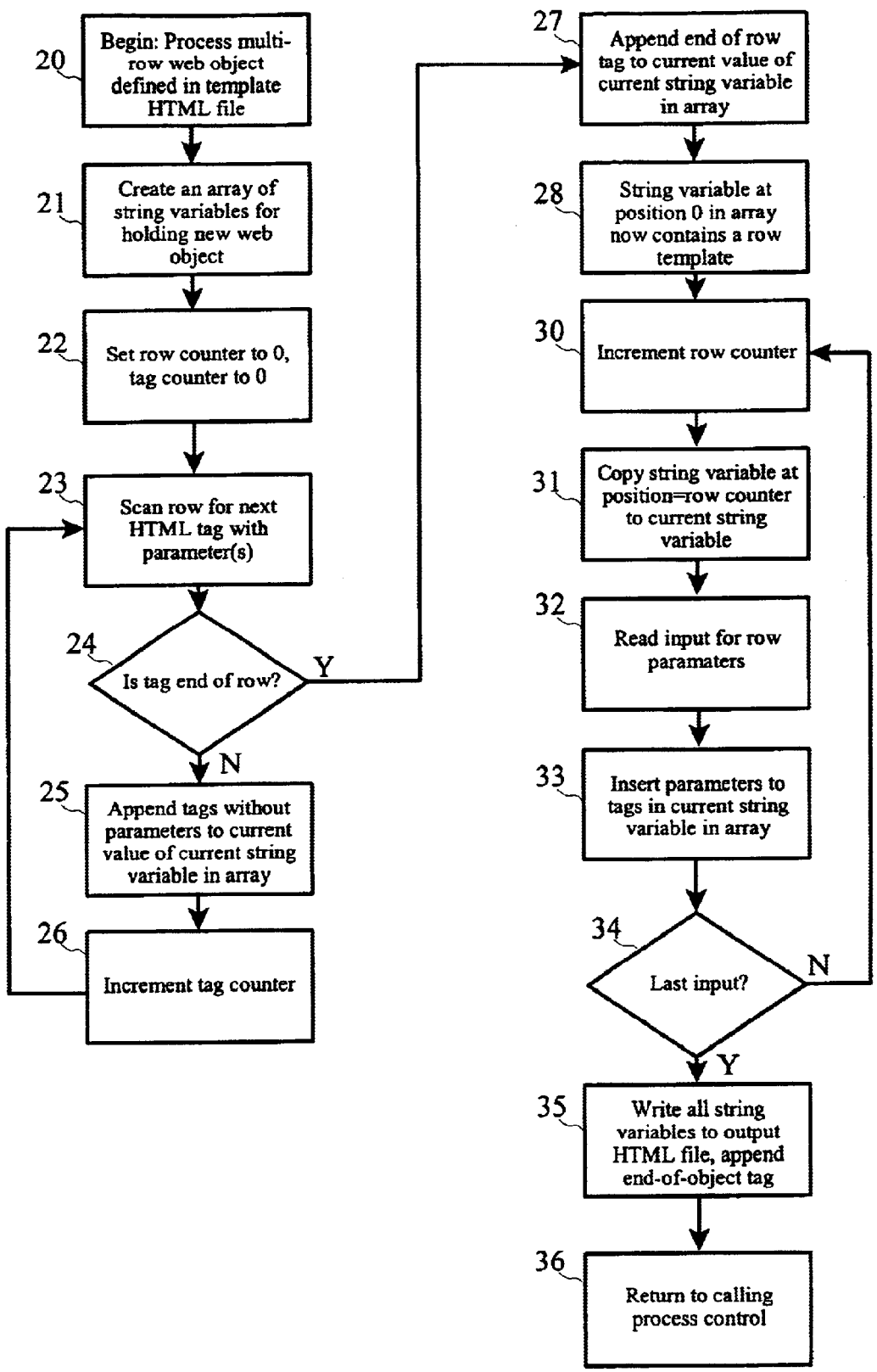
FIG. 2 illustrates the functional flow of the dynamic row count template and mapping process.

Turning to FIG. 2, the functional flow of this method is shown. The method is preferably implemented in Java, but can be implemented in essentially any suitable programming language. This method is fired or executed only to process multi-row web objects, such as tables, lists, and radio buttons, so the beginning (20) of the process in FIG. 2 assumes that the multi-row object in the input HTML file has already been detected and has been read into a string buffer so that it can be operated on using Java methods such as "append", "substring", and "indexOf".

First, the method creates (21) an array of string variables. In each string variable, a new line of HTML which describes a single row in the new output HTNL will be built. A row counter and a tag counter allow for control looping necessary to step through the input HTML and the array entries, so these counters should be initialized (22). Then, the input line of HTML is scanned (23) for the first HTML tag which appears in the code. As in the disclosure of the related application, the scanning function also compares the found tag to the tags which have been created in the system dictionary. If the tag does not indicate an end of a row in the web object, e.g. it is not a </TR> or </LI>, then the found tag is appended (25) to the current row being built in the array, but without the parameters for the tag as found in the input HTML. For example, if a tag such as <TD ALIGN= Left>, the tag would be appended to the end of the existing string value in the current row of the array as <TD ALIGN=>. The tag counter, which helps to regulate the total number of tags processed and to detect endless loop conditions, is then incremented (26), and the next tag is scanned and processed (23). This continues until the end of row tag, such as </TR> or </LI> is found (24). The end of row tag is finally appended (27) to the first string variable's value. Now (28), an entire row of the source or input multi-row web object has been scanned, stripped of its parameters and the text content, and stored in the first string variable of the array.

Next, the template row from the first string variable of the array is copied into each of the other string variables of the array, and the input parameters are mapped into the string variables for each row of the new web object. So, the array row counter is incremented (30), the value of the first array entry is copied (31) to the second array entry, and the first input value is read from the parameter input source. If the parameter input source is a file, such as a comma-separated-variable ("CSV") text file, this input step is as simple as well-known functions available in most programming languages to read a line from a text file. The input source for the parameters could as well be a database or a network interface, for which an application programming interface ("API") callmay be made. Then, the parameters are inserted or mapped into the current string value of the current member of the array.

Table 4 shows an example of the template string value before the mapping process.

TABLE 4

Example Row Template String Value array[n] = "<TR><TD></TD><TD></TD><TD></TD></TR>"

Table 5 shows an example of a line of CSV parameters to be mapped into the string value.

TABLE 5

Example CSV Parameter Input

1st cell content, 2nd cell content, 3rd cell content<CR>

Table 6 shows the resulting string value after mapping, in which a single 3-cell row of a table has been build in HTML. This string value at array[h] is ready for writing to the output, such as to an open output file in which the new HTML file is being created.

TABLE 6

Example Mapped Row of HTML array[n] = "<TR><TD>1st cell content</TD><TD>2nd cell content</TD><TD>3rd cell content</TD></TR>"

As shown in FIG. 2, this process is continued by checking to see if all the input parameters have been mapped (34). If not, then the row counter is incremented, and the next row of HTML is built in the next array member. If so, then the string values of the array are written or output (35), preferably to a text file in which the new, mapped HTML is being created. Then, control is returned to the calling process, which may continue to process more input HTML.

It will be understood from the foregoing description that various modifications and changes may be made in the preferred embodiment of the present invention without departing from its true spirit, such as the use of alternate programming methodologies or languages, alternate web server platforms, operating systems and development tool sets. It is intended that this description is for purposes of illustration only and should not be construed in a limiting sense. The scope of this invention should be limited only by the language of the following claims.

What is claimed is:

1. A method for converting fixed-count multi-row web objects in a web document to variable-count multi-row web objects in a web document for distribution to and display on a web browser computer, each row of said web object having a row format definition and row content definition; said method comprising the steps of:

scanning one or more lines of a web object for a row format definition which matches a definition in a system dictionary;

extracting a matching row format definition from a fixed-count multi-row web object;

storing said extracted row format definition into the values of a plurality of string variables embodied in a computer readable media;

inserting content definition into each row format definition in each string variable value; and converting the values of the string variables into a variable-count multi-row web object in a computer readable medium such that said variable-count multi-row web object may be included or appended to a web document for distribution to and display by a web browser computer system.

2. A method for converting fixed-count multi-row web objects to variable-count web objects according to claim 1 wherein said step of extracting a row format definition from a fixed-count multi-row web object further comprises the steps of:

scanning a string of Hyper Text Markup Language for multi-row web object tags; and extracting said Hyper Text Markup Language multi-row web object tags.

3. A method for converting fixed-count multi-row web objects to variable-count multi-row web objects according to claim 2 wherein said step of scanning a string of Hyper Text Markup Language includes scanning for table format definition tags.

4. A method for converting fixed-count multi-row web objects to variable-count multi-row web objects according to claim 2 wherein said step of scanning a string of Hyper Text Markup Language includes scanning for ordered list definition tags.

5. A method for converting fixed-count multi-row web objects to variable-count multi-row web objects according to claim 2 wherein said step of scanning a string of Hyper Text Markup Language includes scanning for unordered list definition tags.

6. A method for converting fixed-count multi-row web objects to variable-count multi-row web objects according to claim 1 further comprising the step of creating an array of string variables in a computer readable medium for retention of said string variable values.

7. A method for converting fixed-count multi-row web objects to variable-count multi-row web objects according to claim 1 wherein said step of converting the values of the string variables into a variable-count multi-row web object in a computer readable medium further comprises converting the values of the string variables into a Hyper Text Markup Language multi-row web object.

8. A method for converting fixed-count multi-row web objects to variable-count multi-row web objects according to claim 7 wherein said step of converting said values of the string variables into a Hyper Text Markup Language multi-row web object further comprises creating a Hyper Text Markup Language table object.

9. A method for converting fixed-count multi-row web objects to variable-count multi-row web objects according to claim 7 wherein said step of converting said values of the string variables into a Hyper Text Markup Language multi-row web object further comprises creating a Hyper Text Markup Language unordered list object.

10. A method for converting fixed-count multi-row web objects to variable-count multi-row web objects according to claim 7 wherein said step of converting said values of the string variables into a Hyper Text Markup Language multi-row web object further comprises creating a Hyper Text Markup Language ordered list object.

11. A method for converting fixed-count multi-row web objects to variable-count multi-row web objects according to claim 1 wherein said step of converting the values of the string variables into a variable-count multi-row web object in a computer readable medium further comprises storing said variable-count multi-row web object in a Hyper Text Markup Language computer readable text file.

12. A system for conversion of fixed-row count web objects to variable-row count web objects for inclusion of said web objects into web pages for distribution and display on a web browser computer, said fixed-row count web object having a plurality of row format and row content definitions, said system comprising:

a means for scanning one or more lines of a web object for a row format definition which matches a definition in a system dictionary;

a means for extracting a matching row format definition from a fixed-row count web object;

a means for storing said extracted row format definition into a plurality of string variable values in a computer readable medium;

a means for inserting content definitions into each value of said string variables; and a means for converting said values of the plurality of string variables into a variable-row count web object suitable for inclusion in a web document for distribution to and display by a web browser computer.

13. A system for conversion of fixed-row count web objects to variable-row count web objects according to claim 12 wherein said means for extracting a row definition from a fixed-row count web object further comprises:

a means for scanning a string of Hyper Text Markup Language for multi-row web object tags; and a means for extracting said Hyper Text Markup Language multi-row web object tags.

14. A system for conversion of fixed-row count web objects to variable-row count web objects according to claim 13 wherein said means for scanning a string of Hyper Text Markup Language for multi-row web object tags further comprises a means for scanning for table format definition tags.

15. A system for conversion of fixed-row count web objects to variable-row count web objects according to claim 13 wherein said means for scanning a string of Hyper Text Markup Language for multi-row web object tags further comprises a means for scanning for unordered list definition tags.

16. A system for conversion of fixed-row count web objects to variable-row count web objects according to claim 13 wherein said means for scanning a string of Hyper Text Markup Language for multi-row web object tags further comprises a means for scanning for ordered list definition tags.

17. A system for conversion of fixed-row count web objects to variable-row count web objects according to claim 12 further comprising a means for creating an array in a computer readable medium for organizing and managing said plurality of string variable values.

18. A system for conversion of fixed-row count web objects to variable-row count web objects according to claim 12 wherein the means for converting said values of the plurality of string variables into a variable-row count web object further comprises a means for creating a Hyper Text Markup Language multi-row web object.

19. A system for conversion of fixed-row count web objects to variable-row count web objects according to claim 18 wherein said means for creating a Hyper Text Markup Language multi-row web object further comprises a means for creating a Hyper Text Markup Language table object.

20. A system for conversion of fixed-row count web objects to variable-row count web objects according to claim 18 wherein said means for creating a Hyper Text Markup Language multi-row web object further comprises a means for creating a Hyper Text Markup Language unordered list object.

21. A system for conversion of fixed-row count web objects to variable-row count web objects according to claim 18 wherein said means for creating a Hyper Text Markup Language multi-row web object further comprises a means for creating a Hyper Text Markup Language ordered list object.

22. A system for conversion of fixed-row count web objects to variable-row count web objects according to claim 18 wherein said means for creating a Hyper Text Markup Language multi-row web object further comprises a means for storing said multi-row web object in a Hyper Text Markup Language computer readable text file.

23. A computer program product encoded with software for converting fixed-count multi-row web objects to variable-count multi-row web objects for use in web documents to be distributed to and displayed by web browser computers, said fixed-count multi-row web objects including row format definitions and row content definitions, said software comprising:

a scanning program code means for scanning one or more lines of a web object for a row format definition which matches a definition in a system dictionary;

a row format extraction program code means for extracting a matching row format definition from a fixed-count multi-row web object;

a string variable calculating program code means for setting the values of a plurality of string variables to a string value equal to the extracted row format definition;

a content insertion program code means for inserting content definitions into said plurality of string variable values; and a multi-row web object creation program code means for creating a variable-count multi-row web object based upon the values contained in said plurality of said string variables such that said created variable-count multi-row web object is suitable for inclusion into a web document for distribution to and display by a web browser computer.

24. A computer program product for converting fixed-count multi-row web objects to variable-count multi-row web objects according to claim 23 wherein said row format extraction program code means further comprises computer program means for Hyper Text Markup Language tag scanning and extraction.

25. A computer program product for converting fixed-count multi-row web objects to variable-count multi-row web objects according to claim 24 wherein said Hyper Text Markup Language tag scanning and extraction program code means further comprises computer program means for Hyper Text Markup Language table tag scanning and extraction.

26. A computer program product for converting fixed-count multi-row web objects to variable-count multi-row web objects according to claim 24 wherein said Hyper Text Markup Language tag scanning and extraction program code means further comprises computer program means for Hyper Text Markup Language unordered list tag scanning and extraction.

27. A computer program product for converting fixed-count multi-row web objects to variable-count multi-row web objects according to claim 24 wherein said Hyper Text Markup Language tag scanning and extraction program code means further comprises computer program means for Hyper Text Markup Language ordered list tag scanning and extraction.

28. A computer program product for converting fixed-count multi-row web objects to variable-count multi-row web objects according to claim 23 wherein said multi-row web object creation program code means further comprises a computer program means for creating Hyper Text Markup Language multi-row web objects.

29. A computer program product for converting fixed-count multi-row web objects to variable-count multi-row web objects according to claim 28 wherein said computer program means for creating Hyper Text Markup Language multi-row web objects further comprises computer program means for creating Hyper Text Markup Language tables.

30. A computer program product for converting fixed-count multi-row web objects to variable-count multi-row web objects according to claim 28 wherein said computer program means for creating Hyper Text Markup Language multi-row web objects further comprises computer program means for creating Hyper Text Markup Language unordered lists.

31. A computer program product for converting fixed-count multi-row web objects to variable-count multi-row web objects according to claim 28 wherein said computer program means for creating Hyper Text Markup Language multi-row web objects further comprises computer program means for creating Hyper Text Markup Language ordered lists.

32. A computer program product for converting fixed-count multi-row web objects to variable-count multi-row web objects according to claim 23 wherein said multi-row web object creation program code means further comprises computer program means for creating a Hyper Text Markup Language text file in a computer readable medium.

* * * * *